United States Patent

[11] 3,562,393

[72] Inventors Harold S. Jackson
Troy, N.Y.;
Jack W. Skinner, New Kensington, Pa.
[21] Appl. No. 854,355
[22] Filed Aug. 21, 1969
[45] Patented Feb. 9, 1971
[73] Assignee Allegheny Ludlum Steel Corporation
Pittsburgh, Pa.
a corporation of Pennsylvania

[54] DETECTOR CIRCUIT FOR CONSUMABLE ELECTRODE FURNACE
9 Claims, 1 Drawing Fig.

[52] U.S. Cl. .................................................. 13/9
[51] Int. Cl. ............................................ F27d 11/02, H05b 3/00
[50] Field of Search ........................................... 13/9, 13, 14, 12; 314/10

[56] References Cited
UNITED STATES PATENTS
3,187,159 6/1965 Kilian .......................... 13/9
3,495,018 2/1970 Jackson et al. ............... 13/9X Primary Examiner—Bernard A. Gilheany
Assistant Examiner—Roy N. Envall, Jr.
Attorneys—Richard A. Speer, Vincent G. Gioia and Howard R. Berkenstock, Jr.

ABSTRACT: Detector circuitry for indicating progress of melting of an electrode in a consumable electrode furnace having an isolated alternating current source transformer coupled to a detector circuit which is series connected to the electrode, and signaling alarm means in an isolated circuit relationship.

PATENTED FEB 9 1971
3,562,393
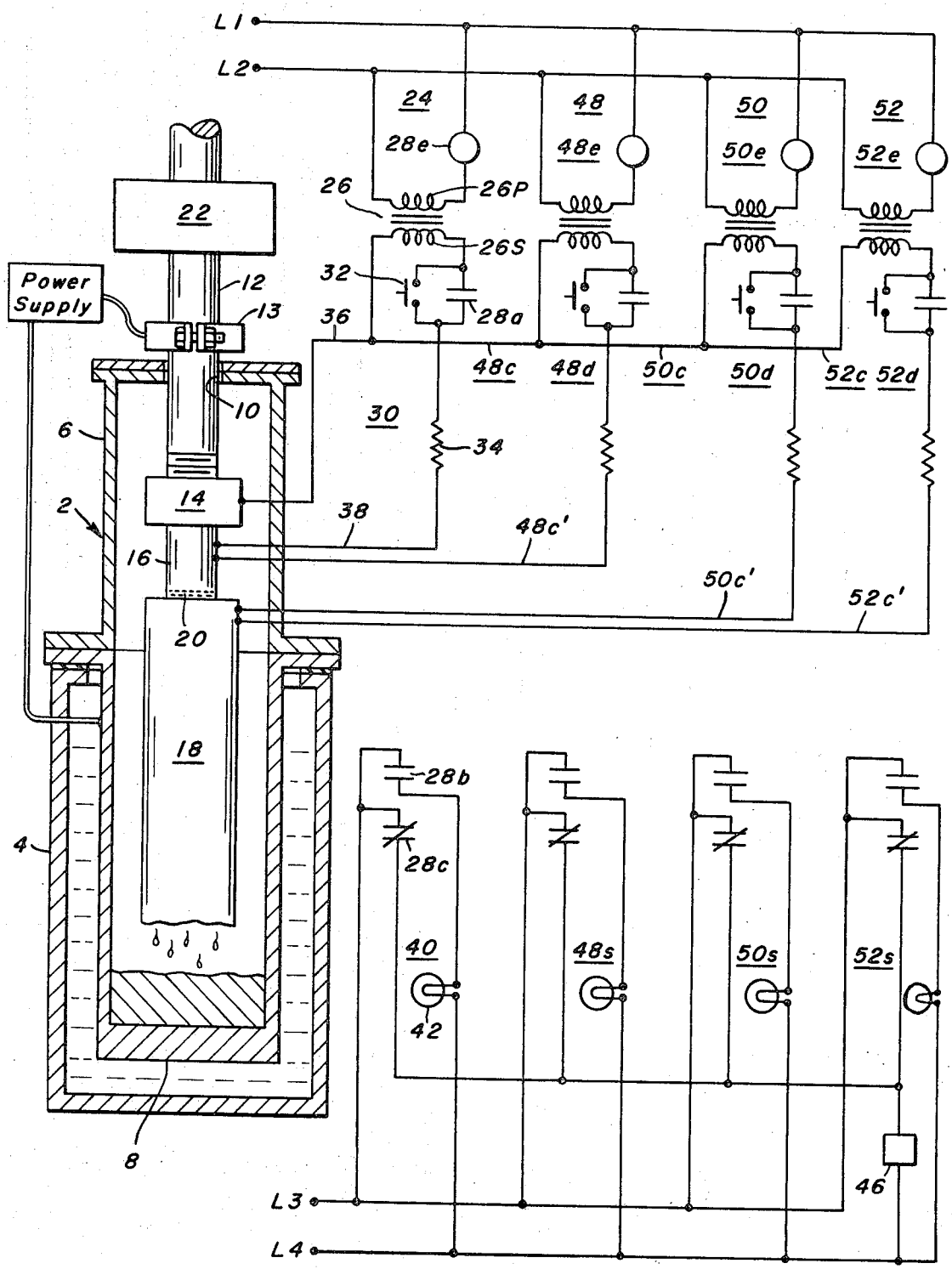
INVENTORS.
HAROLD S. JACKSON &
JACK W. SKINNER
By Howard R. Berkenstock
Attorney

DETECTOR CIRCUIT FOR CONSUMABLE ELECTRODE FURNACE

BACKGROUND OF THE INVENTION

As is known, consumable arc-melting furnaces usually comprise an electrode of metal to be melted, extending downwardly into a conductive mold or crucible which receives the molten metal as the electrode is melted and within which an ingot is formed. The electrode is connected to a power supply with the circuit being completed through the conductive mold. Usually, in starting the melt, a small supply of chips or the like, is placed in the mold so that when the arc is struck between the electrode and the mold the chips are melted to form an initial molten metal supply in the crucible mold. After the arc is initially struck, the arc is maintained between the electrode to be melted and the molten pool beneath it; the electrode being melted due to the heat of the arc. As the electrode is melted it is deposited in the crucible and forms the aforesaid mentioned pool. The molten metal deposited in the crucible continuously solidifies as the electrode melts to form an ingot which increases in length starting from the bottom upwardly. In the process, impurities float to and on top of the molten pool, and assuming the pool does not solidify during formation of the ingot, the major portion of the impurities will be excluded from the main body of the ingot. During melting, the electrode melts, the bottom portion growing shorter toward its connection to the electrode adjusting means contained above. The electrode is attached by a clamp to a ram and driving equipment therefor which lower the electrode as it is being melted. Although it is desirable to melt as much of the electrode as possible, nevertheless the electrode cannot be melted too close to the clamp, or the clamp will be damaged by the heat, or in some cases, even melted. With most furnaces it is difficult to ascertain by observation when the melting of the electrode has progressed to the upper region, or portion adjacent to the clamp. Mechanical devices have proved unsatisfactory in providing this information. As is well known by those familiar with the art, in the completion of a melting operation a mold may be hot-topped to control the final solidification of the top of the ingot and the removal of impurities therein prior to shutdown of a furnace. An alarm system providing accurate information as to the progress of the melting of the electrode in order to insure hot-topping in the proper sequence prior to shutdown of the furnace and shutdown of the furnace prior to melting of the clamp is necessary to uniformity and quality of the ingot formed.

Alarm systems have been developed and disclosed through, such as U.S. Pat. Nos. 3,187,159 and 3,354,254 illustrating means for providing an indication of progress of melting by connection of an alarm circuit between an electrode and the driving ram. The systems there disclosed and known conventionally are unsatisfactory for a variety of reasons, among which are: the circuitry is dependent upon the DC melting polarity at the electrode; the relay circuitry involved is directly connected to the melting furnace; and cumbersome, heavy-duty DC relays are required. The detector circuitry disclosed in this application overcomes the disadvantages of conventional circuitry and provides an alarm system which is isolated from the melting furnace and which offers safety and reliability previously unavailable.

SUMMARY OF THE INVENTION

The detector circuit for a consumable electrode furnace for indicating progress of melting the electrode includes an AC source for a relay-energizing coil isolated from the furnace through a transformer to which is connected a detector circuit containing the secondary of said transformer and enabling means to energize the AC relay and an isolated signaling circuit, actuated by loss of a reflected low impedance through the transformer by opening the detector circuit connected to the melting electrode.

The isolated circuitry of the invention provides a detector circuit independent of the melting power in the electrode, allows use of an AC relay and permits isolation of the signaling circuit and relay means from the furnace, carrying high melting currents.

DESCRIPTION OF THE DRAWINGS

The FIG. is a diagram of the electrical circuitry illustrating the invention.

DESCRIPTION OF THE PREFERRED EMBODIMENT

Referring now to the drawing, reference numeral 2 indicates a furnace housing for a consumable electrode furnace having a lower shell 4 and an upper shell 6. A melting crucible 8 of a conductive material such as copper is disposed within the lower shell 4 and secured to the housing 2 in an insulated manner as is known in the art. Upper shell 6 has an opening 10 provided with suitable sealing means (not shown) and through which a ram 12 is slidably disposed and sealed therein. The ram 12 is provided with a clamp 14 as, for example, the clamp shown in U.S. Pat. No. 3,046,319, at the end thereof which clamps the stub end 16 of the electrode to be consumably melted. The stub end 16 of the electrode is usually welded to the main body 18 of the electrode as shown at 20. The melting current is provided to the electrode from an external source indicates as POWER SUPPLY. A drive mechanism 22 is provided externally on the furnace and is adapted to move the electrode and ram vertically within the housing. Drive mechanisms are well known in the art to raise and lower the electrode to maintain the proper preselected arc length, the overall result of which is a general lowering of the electrode as the melting progresses.

In the alarm system of the invention, an isolated AC power supply (110 v. in the example) is available at terminals L1 and L2 for primary circuits including transformer 26 having primary winding 26p and secondary winding 26s and AC relay energizing coil 28e, having normally open contacts 28a, 28b and normally closed contacts 28c. Detector circuit 30 is linked to enabling circuit 24 through secondary 26s of transformer 26. Detector circuit 30 includes transformer secondary 26s in series with switch 32, which is in parallel with normally open relay contact 28a and protective impedance 34 which in the embodiment disclosed is a 1,000 ohm resistor. Detector circuit 30 is connected through conductor 36 to clamp 14 and through conductor 38 to stub 16 completing the circuit. Alarm circuit 40 is linked to enabling circuit 24 through relay contacts 28b, and c, and has an isolated power source (such as 24 v. DC in the example) at terminals L3 and L4. In the embodiment disclosed, alarm circuitry includes an alarm lamp 42 in series with contact 28b and a conjunctive audio alarm 46 in series with contact 28c. In the example, a second alarm system 48 parallels that just described, including enabling circuitry 48e, detector circuit 48d and signaling circuit 48s. It will be noted that detector circuit 48d is connected to clamp 14 through conductor 48c and to stub 16 through 48c', paralleling conductors 36 and 38 of the previous circuit. The alarm systems just described being connected between clamp 14 and stub 16, provide an indication that melting of the electrode stub 16 has progressed to the point of connection of conductors 38 and 48c', signaling a time appropriate for furnace shutdown. A "hot-top" alarm system 50 including enabling circuitry 50e, detector circuitry 50d and signaling circuitry 50s similar to the systems previously described is connected to furnace 2 through conductor 50c at clamp 14 and 50c' in the vicinity of the top of electrode 18. Thus being connected, progress of melting to the top of electrode 18 is indicated with the actuation of circuit 50. Again, for increased reliability of hot-top indication, a second "hot-top" alarm system 52 is connected substantially in parallel with system 50, having enabling circuitry 52e, detector circuitry 52d and signaling circuit 52s. While the FIG. shows a common lead to clamp 14, it may be advantageous to utilize separate conductors such as extending conductors 36, 48c, 50c, 52c to connect directly to clamp 14.

In operation, power is supplied through POWER SUPPLY establishing a melting current through connector 13, ram 12, clamp 14, stub 16, electrode 18 and into crucible 8. As melting continues, electrode 18 will grow shorter and eventually disappear, at which point conductors 50c' and 52c' will be melted away (at their contact point with electrode 18), reflecting an open circuit in their respective circuits 50d and 52d. As melting is permitted to continue, stub 16 will melt and as the progression reaches conductors 38 and 48c', these, too, will melt away from the stub 16 and open circuits 30 and 48d.

As melting is initiated within furnace 2, the alarm system will be enabled. This is accomplished by closing switch 32 which in turn, completes the circuit in the detector circuit through transformer secondary 26s, conductor 36, clamp 14, ram 12, stub 16, conductor 32 and resistor 34. The closing of this circuit reflects a low impedance through the coupling of transformer 26 into the primary 26p. The low impedance reflection in enabling circuit 24 permits the voltage source at L1 and L2 to establish a holding current through relay-energizing coil 28e. The holding current through relay 28 in turn closes normally open contacts 28a, 28b and opens normally closed contacts 28c. The alarm circuit 24 will then remain in this static-armed condition until melting progresses to the point where conductor 38 is melted away from electrode stub 16. At such point, the opening of detector circuit 30, removes the low-reflected impedance to transformer primary 26p, now reflecting a large impedance through a coupling of transformer 26 and restricting the flowing of enabling current in circuit 24. The significantly reduced current in circuit 24 allows relay 28 to drop out, thus opening contacts 28a, b and c. At such instant, lamp 42 will be deprived of its source voltage from L3 and L4 by the opening of contact 28b extinguishing lamp 42. Likewise, power will be supplied to alarm 46 by the closing of contact 28c sounding the alarm.

Alarm circuit 48 will operate similarly to that previously described actuating its respective alarm and extinguishing its lamp as conductor 48c' is melted away from electrode stub 16. This event should occur essentially simultaneously with the alarm of circuit 24, since conductors 38 and 48c' are connected at essentially the same location on electrode stub 16. Alarm circuits 50 and 52 will actuate in time earlier in the melting cycle than the previously described circuits sine their detector circuits are joined to the electrode 18 in the vicinity of the top of said electrode. Thus, as melting progresses from the electrode 18 to stub 16, conductors 50c' and 52c' will be opened, thus opening their respective detector circuits 50d and 52d, and accordingly actuating their respective alarm circuits.

It will be recognized by those skilled in the art that a similar isolated system may be connected to the electrode at predetermined points to give appropriate indication as melting progresses past these points. It should also be apparent that functions other than the lighting or extinguishing of lamps and the sounding of audio alarms may be performed by the above circuitry by merely connecting the appropriate enabling circuit of other functional devices. These and other similar embodiments are thus, considered to be within the true spirit of the invention and embodied within the scope of the appended claims.

We claim:

1. A consumable electrode arc furnace having a crucible, a vertically reciprocal ram disposed above said crucible; a consumable electrode supported by and in electrical contact with said ram; electrical power supply connected to said ram and said crucible to establish an electrical arc between said electrode and said crucible to melt said electrode, means to vertically position said ram and electrode, detector circuit means electrically connected to said electrode at a predetermined position, signaling means disposed externally of said furnace responsive to said detector circuit means; enabling circuit means isolated electrically from said detector circuit means to establish a signal current in said detector circuit, said signal means responsive to interruption of said signal current in said detector circuit.

2. Apparatus according to claim 1 including secondary power supply means connected to said signaling means in an isolated circuit relation from said detector circuit.

3. Apparatus according to claim 2 wherein said first isolated power supply means is AC and is connected in series with the primary of an impedance coupler, and the energizing coil of an AC relay and said detector circuit includes the secondary of said impedance coupler and said signaling means is responsive to said AC relay.

4. Apparatus according to claim 3 wherein said detector circuit includes an impedance to protect said circuit from being inadvertently short circuited.

5. Apparatus according to claim 4 wherein said detector circuit includes enabling means to energize said AC relay energizing coil and said impedance coupler is a stepdown transformer.

6. Apparatus according to claim 5 wherein said enabling means includes normally open AC relay contacts operable by said relay energizing coil in parallel with switching means in series with said detector circuit whereby closing of said switching means causes said transformer secondary winding to reflect low impedance into said transformer primary winding to establish a holding current through the energizing coil of said AC relay.

7. Apparatus according to claim 6 including a plurality of detector circuits, each having isolated power supply means and signaling means.

8. Apparatus according to claim 6 including detector circuit means connected between predetermined points on said ram.

9. Apparatus according to claim 8 wherein said signaling means includes visual and audio alarm means responsive to said detector circuit.